(12) United States Patent
DeMarco et al.

(10) Patent No.: US 11,722,909 B2
(45) Date of Patent: Aug. 8, 2023

(54) SYSTEMS AND METHODS FOR VENUE BASED WIRELESS COMMUNICATION

(71) Applicant: Matsing, Inc., Irvine, CA (US)

(72) Inventors: Anthony DeMarco, Leadville, CO (US); Leonid Matytsine, Irvine, CA (US); Serguei Matitsine, Dallas, TX (US)

(73) Assignee: Matsing, Inc., Irvine, CA (US)

( * ) Notice: Subject to any disclaimer, the term of this patent is extended or adjusted under 35 U.S.C. 154(b) by 0 days.

(21) Appl. No.: 17/669,949

(22) Filed: Feb. 11, 2022

(65) Prior Publication Data

US 2022/0167179 A1 May 26, 2022

Related U.S. Application Data

(63) Continuation of application No. 16/987,619, filed on Aug. 7, 2020, now Pat. No. 11,272,379, which is a continuation of application No. 16/253,133, filed on Jan. 21, 2019, now Pat. No. 10,757,580.

(60) Provisional application No. 62/619,639, filed on Jan. 19, 2018.

(51) Int. Cl.
| | |
|---|---|
| *H04W 4/00* | (2018.01) |
| *H04W 16/20* | (2009.01) |
| *H04W 4/33* | (2018.01) |
| *H04L 41/0806* | (2022.01) |
| *H04B 7/022* | (2017.01) |
| *H04W 16/28* | (2009.01) |
| *H04B 7/06* | (2006.01) |

(52) U.S. Cl.
CPC ............ *H04W 16/20* (2013.01); *H04B 7/022* (2013.01); *H04B 7/0617* (2013.01); *H04L 41/0806* (2013.01); *H04W 4/33* (2018.02); *H04W 16/28* (2013.01)

(58) Field of Classification Search
CPC ....... H04W 16/20; H04W 4/33; H04W 16/28; H04W 16/30; H04W 16/26; H04B 7/022; H04B 7/0617; H04L 41/0806
See application file for complete search history.

(56) References Cited

U.S. PATENT DOCUMENTS

| | | | | |
|---|---|---|---|---|
| 3,013,268 | A * | 12/1961 | Raymond | H01Q 11/10 343/792.5 |
| 3,044,066 | A * | 7/1962 | Butler | H01Q 13/26 343/771 |
| 4,777,958 | A * | 10/1988 | Ophir | A61B 8/00 600/437 |

(Continued)

*Primary Examiner* — Thai D Hoang
(74) *Attorney, Agent, or Firm* — Fish IP Law, LLP

(57) ABSTRACT

A plurality of directional antennas are arranged between an inner barrier (e.g., ring, wall, fence, glass, etc encircling a field, court, rink, stage, etc) and an outer barrier (e.g., guardrail, wall, etc encircling a seating region, etc) of the venue. Each directional antenna produces a beam pattern that is oriented such that the beam pattern is directed at an angle off-normal from the inner or outer barrier. Further, at least some of the directional antennas are placed at the openings of pedestrian tunnels leading into the seating region of the venue, near the inner barrier of the venue seating region, or placed near a midpoint between the inner and outer barriers so as to provide wireless communication services to users in the seating region of the venue.

14 Claims, 6 Drawing Sheets

(56) References Cited

U.S. PATENT DOCUMENTS

| | | | |
|---|---|---|---|
| 4,807,635 A * | 2/1989 | Ophir | A61B 8/00 600/437 |
| 6,501,963 B1 * | 12/2002 | Balents | H01Q 1/00 455/562.1 |
| 8,831,684 B2 * | 9/2014 | Kenington | H04B 7/0617 367/138 |
| 9,715,609 B1 * | 7/2017 | Fink | G06K 7/10366 |
| 9,761,957 B2 | 9/2017 | Kwiatkowski | |
| 2002/0048423 A1 * | 4/2002 | Frick | G02B 6/3536 385/10 |
| 2003/0011529 A1 * | 1/2003 | Gottl | H01Q 1/40 343/795 |
| 2004/0222937 A1 * | 11/2004 | Gottl | H01Q 9/28 343/797 |
| 2005/0012665 A1 * | 1/2005 | Runyon | H01Q 1/246 342/372 |
| 2005/0091596 A1 | 4/2005 | Anthony | |
| 2006/0040706 A1 * | 2/2006 | Wu | H01Q 3/2605 455/562.1 |
| 2007/0068908 A1 * | 3/2007 | Grek | B23K 26/0006 219/121.8 |
| 2008/0173620 A1 * | 7/2008 | Grek | B23K 26/40 219/121.8 |
| 2009/0002253 A1 * | 1/2009 | Hilgers | H01Q 1/2225 343/850 |
| 2011/0141725 A1 * | 6/2011 | Brusilovsky | F21V 23/009 362/231 |
| 2012/0112983 A1 | 5/2012 | Mathews | |
| 2013/0044650 A1 * | 2/2013 | Barker | H04B 7/0617 370/278 |
| 2014/0070977 A1 * | 3/2014 | Stocke, Jr. | H01Q 17/00 342/1 |
| 2015/0223125 A1 * | 8/2015 | Lu | H04W 48/20 455/440 |
| 2016/0291324 A1 * | 10/2016 | Arndt | B32B 17/10568 |
| 2016/0359237 A1 | 12/2016 | Quan et al. | |
| 2017/0003503 A1 * | 1/2017 | Arndt | B32B 17/10568 |
| 2017/0125908 A1 * | 5/2017 | Pance | H01Q 1/36 |
| 2019/0067804 A1 * | 2/2019 | Dabrowski | H01Q 5/30 |
| 2019/0319357 A1 * | 10/2019 | Pance | H01Q 21/061 |

* cited by examiner

SYSTEMS AND METHODS FOR VENUE BASED WIRELESS COMMUNICATION

This application is a continuation of U.S. application Ser. No. 16/987,619, filed Aug. 7, 2020, which is a continuation of U.S. application Ser. No. 16/253,133, filed Jan. 21, 2019, which claims the benefit of U.S. provisional application No. 62/619,639 filed Jan. 19, 2018. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is wireless communication.

BACKGROUND

The background description includes information that may be useful in understanding the present invention. It is not an admission that any of the information provided herein is prior art or relevant to the presently claimed invention, or that any publication specifically or implicitly referenced is prior art.

As wireless communication devices continue to proliferate, wireless communication providers develop improved methods and systems to efficiently provide wireless communication services to a growing user base. While adding communication towers or radios may improve wireless service in rural or even urban regions, other solutions are required for the complications presented by high concentrations of wireless users densely packed into relatively small regions with limited space, such as venues, arenas, or venues.

For example, U.S. Publication No. 2012/0112983 to Mathews ("Mathews") proposes using a portable antenna structure with a multiple antenna modules to collectively cover a venue and provide telecommunications services to customers in the venue. While the teachings of Mathews may improve wireless communication services at a venue, it still suffers limitations in that only a single antenna array is used to avoid interference between multiple arrays, as is taught to be the advancement of Mathews. Mathews also fails to provide a permanent wireless communication system that is integrated with the venue.

U.S. Pat. No. 9,761,957 to Kwiatkowski ("Kwiatkowski") further attempts to improve wireless communication services in a venue by installing multiple horn antennas throughout the venue to provide increased wireless coverage to specific sections of the venue. However, the teachings of Kwiatkowski suffer signal interference between horn antenna directed toward each other. Further, as the Kwiatkowski antennas are static, neither the beams nor the antennas themselves can be redirected to avoid interference or service high concentrations of users. While antennas with directional or shapeable beams are known (e.g., U.S. Publication No. 2016/0359237 to Quan et al.), the problems faced when applying and coordinating antennas in high numbers, in a relatively small region, to service a high concentration of densely packed users have not been solved.

Thus, there is still a need for systems and methods for providing high quality wireless communication services to high concentrations of densely packed users in a small region with limited space, such as a venue.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

Figure 1:
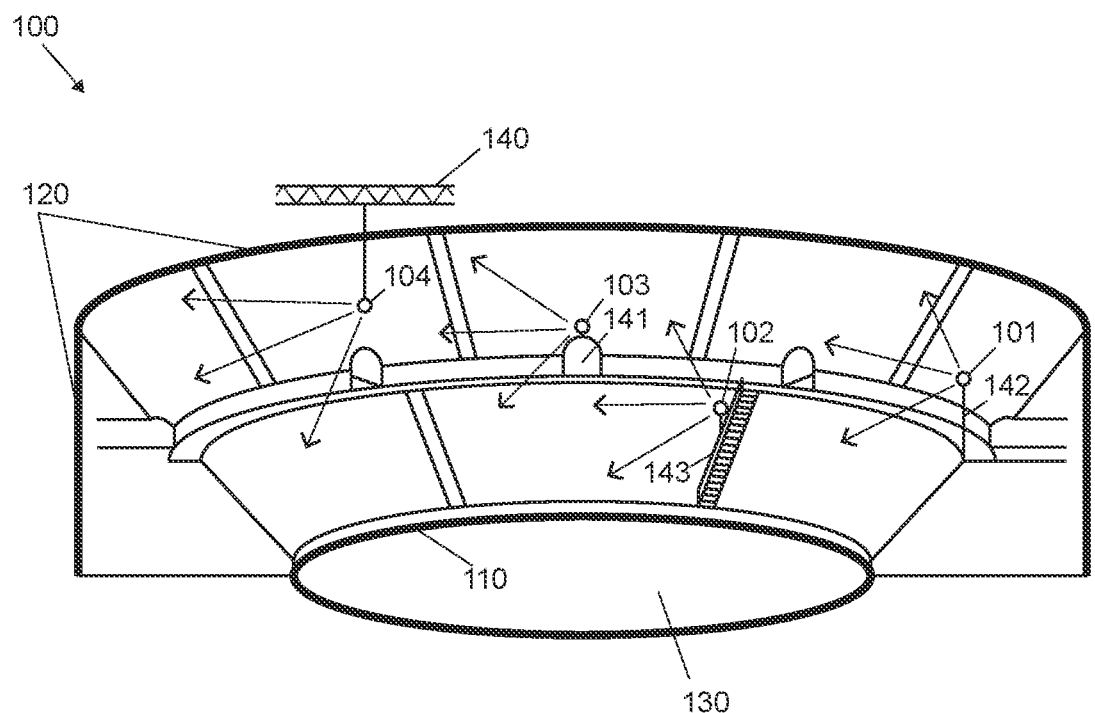
FIG. 1 depicts a cross-sectional view of the arrangement and orientation of a plurality of directional antennas in the seating region of a venue.

The inventive subject matter provides apparatus, systems, and methods in which wireless communication services are provided to users in a stadium, arena, or other venue.

Methods of providing a venue with wireless communication systems include placing directional antennas within venue or about the venue. For example, antennas can be placed under seats, above an opening to a pedestrian tunnel, or on an inner or outer barrier (e.g., ring, wall, fence, glass, etc encircling a field. Antennas in a given venue can be placed in any combination of locations.

As used herein, the term "ring" means a curved boundary about a region. As applied to venues, a ring could be any of the known venue shapes, including substantially round, oval, "U" shaped, or conical. As one of ordinary skill would understand with respect to a "U" shaped venue, the outer boundary 120 of the venue can be discontinuous, and need not subtend an entire 360°.

Preferably each directional antenna is oriented such that the midpoint of its beam pattern is directed at an angle α at least 20° off-normal from the inner or outer barrier. In more preferred embodiments, α is at least 45°. Each directional antenna is preferably oriented at approximately the same angle α. It is further contemplated that one or more of the directional antennas can have steerable beams.

Methods of the inventive subject matter further contemplate placing additional, oppositely oriented directional antennas at the same location of some (or each) of the directional antennas. Viewed from another perspective, if a first antenna is oriented at θ degrees from normal, a second antenna placed at the same location is oriented at θ−180° (θ minus 180°) degrees.

In some embodiments directional antennas are placed at the same location and oriented such that the beams do not overlap substantially (e.g., at least 60% non-overlapping). While it is contemplated that beam patterns of different antennas can overlap each other, in some embodiments a beam pattern of at least one additional directional antenna merely abuts a beam pattern of an adjacent directional antenna.

It is contemplated that one or more of the directional antennas can have more than one beam pattern, and in preferred embodiments at least some antennas are lens based multi-beam antennas with both a high band beam and a low band beam.

It is contemplated that directional antennas will be placed in venues to optimize one or more of operational cost, equipment efficiency, performance of wireless communication, and adaptability of the system. For example, it is generally favorable to place the directional antennas to maximize aesthetic appeal and viewing experience of users at the venue. Thus, at least some of the directional antennas can be placed (1) at the openings of pedestrian tunnels leading into the seating region of the venue, (2) near the inner barrier of the venue seating region, (3) placed near a midpoint between the inner and outer barriers with α ~90°, (4) oriented such that each directional antenna can provide wireless communication services to 3,000 seats in the seating region of the venue. In some embodiments, directional antennas are spaced evenly apart from adjacent antennas.

Methods also contemplate providing wireless communication service to a dynamic user density in a venue. User density across the seating region can be monitored, and at least one overlapping beam of a directional antenna can be redirected from a region of the venue with a low user density to a region with a high user density. Preferably at least some of the directional antennas used in accommodating dynamic user density are lens based multi-beam antennas because the RF elements disposed about the lenses can be easily moved along a track, or electronically phase shifted.

Lens based multi-beam antennas are also thought to be advantageous because the use of multiple beams with a single lens makes it fairly straightforward to provide overlapping beams.

Various objects, features, aspects and advantages of the inventive subject matter will become more apparent from the following detailed description of preferred embodiments, along with the accompanying drawing figures in which like numerals represent like components.

DETAILED DESCRIPTION

FIGS. 1-9 depict various wireless systems of the inventive subject matter applied to venues.

FIG. 1 depicts an arrangement and orientation of a plurality of directional antennas (101, 102, 103, 104) in the seating region of a venue. The venue includes an outer boundary 120 and an inner boundary 110 that together define a seating region of the venue. The inner boundary 110 of the venue surrounds an event region 130 for live performances (e.g., concerts, sports competitions, etc). During events, a large number of users are expected to sit in the seating region and use wireless communication devices.

Each directional antenna emits a beam pattern, illustrated by directional arrows in FIG. 1 and the following figures, unless otherwise noted. In preferred embodiments, each beam in the beam pattern is steerable. However, directional antennas with both steerable and static beams are contemplated. For example, the antenna can comprise steerable high band beams and static low band beams, vice versa, or a mixed combination of static and steerable, high band and low band beams. In the embodiment of FIG. 1, directional antennas are generally positioned inward from the inner boundary 110 near a midpoint between the inner boundary 110 and the outer boundary 120 of the seating region. In preferred embodiments, the location of each antenna corresponds with a physical feature of the venue that is advantageous for mounting the antenna, such as the opening of pedestrian tunnel 141 into the seating. In this embodiment, physical features include hand rail 143, a wall, a speaker pole 142, and a catwalk 140. Also of note, the directional antenna beams of FIG. 1 are generally oriented in a counter-clockwise fashion around the seating region of the venue, though it is contemplated here, and in all other embodiments unless otherwise noted, that the various antenna beams could be oriented in a clockwise fashion. Counter-clockwise or clockwise orientation of adjacent antenna beams is considered favorable as it tends to avoid the interference experienced when two antennas are directed toward each other.

Additionally or alternatively, an antenna with relatively low user activity within its beam pattern, such as antenna 142, can redirect a beam to an overburdened region of an adjacent antenna's beam pattern, such antenna 143, thus improving wireless communication services.

As mentioned above, the plurality of directional antennas 101, 102, 103, and 104 can be configured to be redirected from a lower density region to a higher density region. User density can be calculated by one or both of the number of persons and utilized bandwidth. Beam direction can also be controlled based upon expected future user density. It is contemplated that user density can be predicted based upon any relevant factors, including tickets sales and expected age of the attendees.

Figure 2:
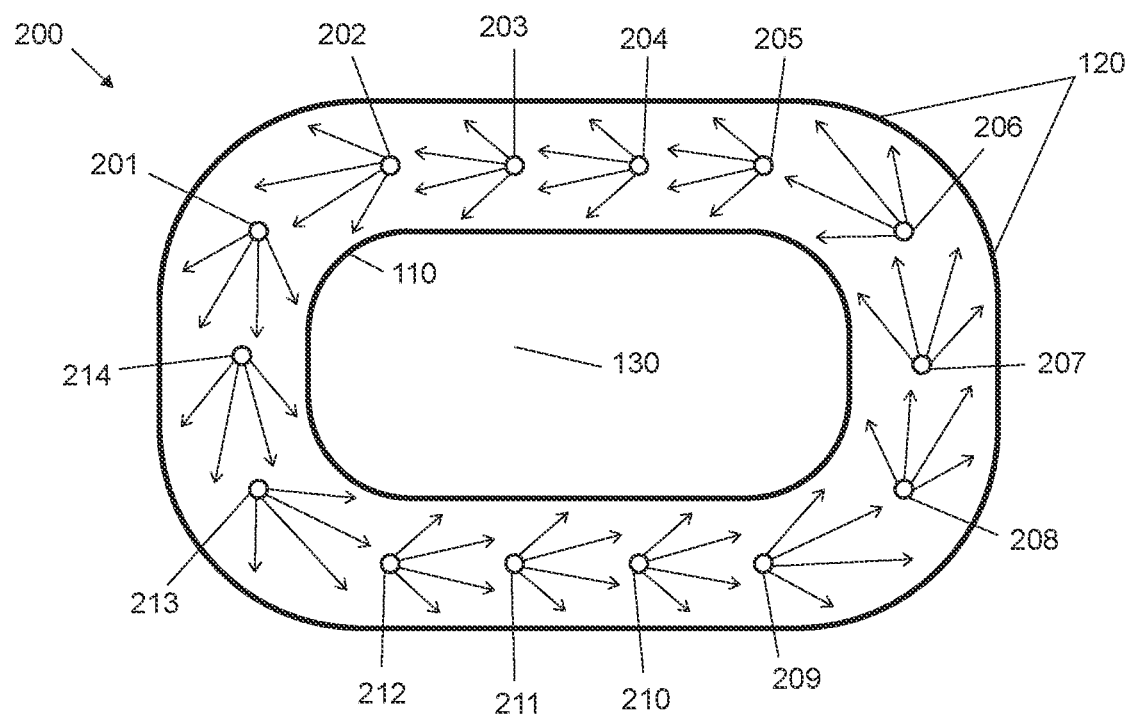
FIG. 2 is top down view of the directional antennas in the seating region of the venue, oriented generally in a counter-clockwise fashion in relation to the venue, and located midway between the inner boundary and the outer boundary of the venue.

FIG. 2 depicts an arrangement and orientation of a plurality of directional antennas in the seating region of a venue. The venue is as described for FIG. 1. Here, directional antennas 201-214 are again oriented generally in a counter-clockwise fashion in relation to the venue. Of particular note, the antennas are generally located midway between the inner boundary 110 and the outer boundary 120. This placement is advantageous as it generally facilitates mounting the antennas to hand rail 143, a staircase, or the opening of pedestrian tunnel 141 near the inner boundary 110 of the venue, as well as providing a location that is more serviceable for repairs or maintenance during a live event than a midpoint of the seating region. Such an arrangement also favorably minimizes the cabling or other informational coupling between the antennas and a centralized or decentralized communication hub.

Lastly, an arrangement where antennas are configured to direct beams generally upward or downward from midpoint of the seating region of the venue, provides a wireless environment with less interference compared to antennas directing beams downward and into the venue from the upper boundary.

Figure 3:
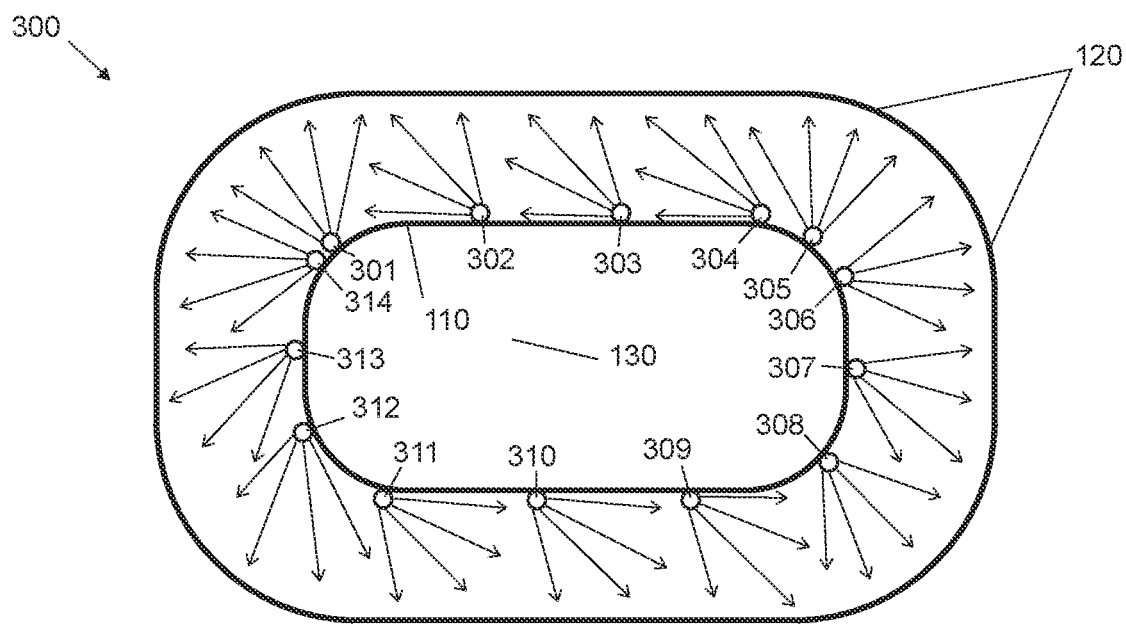
FIG. 3 is a top down view of the directional antennas in the seating region of the venue, where the antennas are oriented generally in a counter-clockwise fashion, located near the inner boundary.

FIG. 3 depicts an arrangement and orientation of a plurality of directional antennas in the seating region of a venue. The venue is as described for FIG. 1. Here, directional antennas 301-314 are oriented generally off-normal from the inner boundary 110 in a counter-clockwise fashion. Of particular note, the antennas are generally located near the inner boundary 110. This placement is advantageous as it generally facilitates mounting the antennas to physical features such as handrail 143, a staircase, or the opening of pedestrian tunnel 141 near the inner boundary 110 of the venue, as well as providing a location that is more serviceable for repairs or maintenance during a live event than a midpoint of the seating region. Such an arrangement also favorably minimizes the cabling or other informational coupling between the antennas and a centralized or decentralized communication hub.

Lastly, an arrangement where antennas are directing beams generally upward and outward from the inner boundary 110 of the venue provides a wireless environment with less interference compared to antennas directing beams downward and into the venue from the upper boundary.

Figure 4:
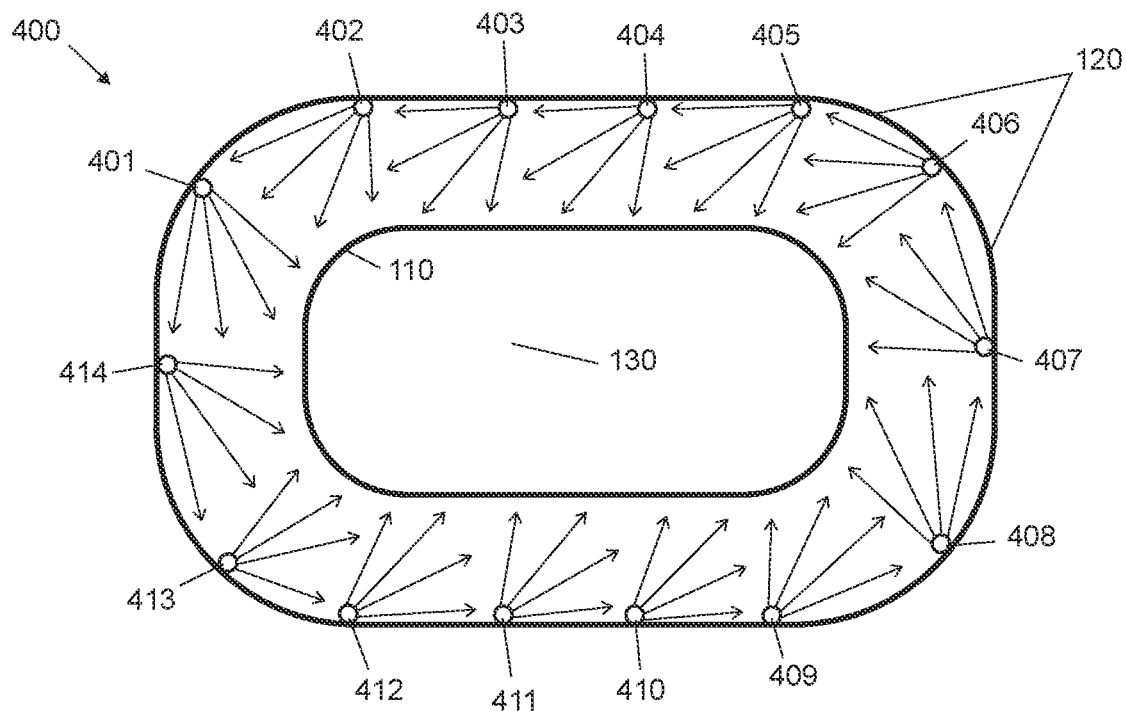
FIG. 4 is a top down view of the directional antennas in the seating region of the venue, where the antennas are oriented generally in a counter-clockwise fashion, located near the outer boundary.

FIG. 4 depicts an arrangement and orientation of a plurality of directional antennas 401-414 in the seating region of a venue. The venue is as described for FIG. 1. Here, directional antennas are oriented generally off-normal from the outer boundary 120 in a counter-clockwise fashion. Of note, the antennas are generally located near the outer boundary 120 of the venue seating region. This placement is advantageous as it facilitates mounting the antennas in a high location, such as flag poles, walls, hand rails, staircases, or openings of pedestrian tunnels near the outer boundary 120 of the venue. It also provides a location that is more serviceable for repairs or maintenance during a live event than a midpoint of the seating region, as workers are unlikely to block spectators' views from the top of the venue. Such an arrangement also favorably allows for beams of antennas to be redirected toward the event region 130 of the venue. This is ideal if the event participants (e.g., coaching staff, ground crew, production staff, athletes, musicians, etc) require wireless communication services.

For example, if a concert is presented in the left half of the event field, with spectator seating in the left half of the venue seating region, beams in antennas on the right half of the seating region can be redirected to provide wireless service for ground crew in the "back stage" region in the right half of the event region.

Figure 5:
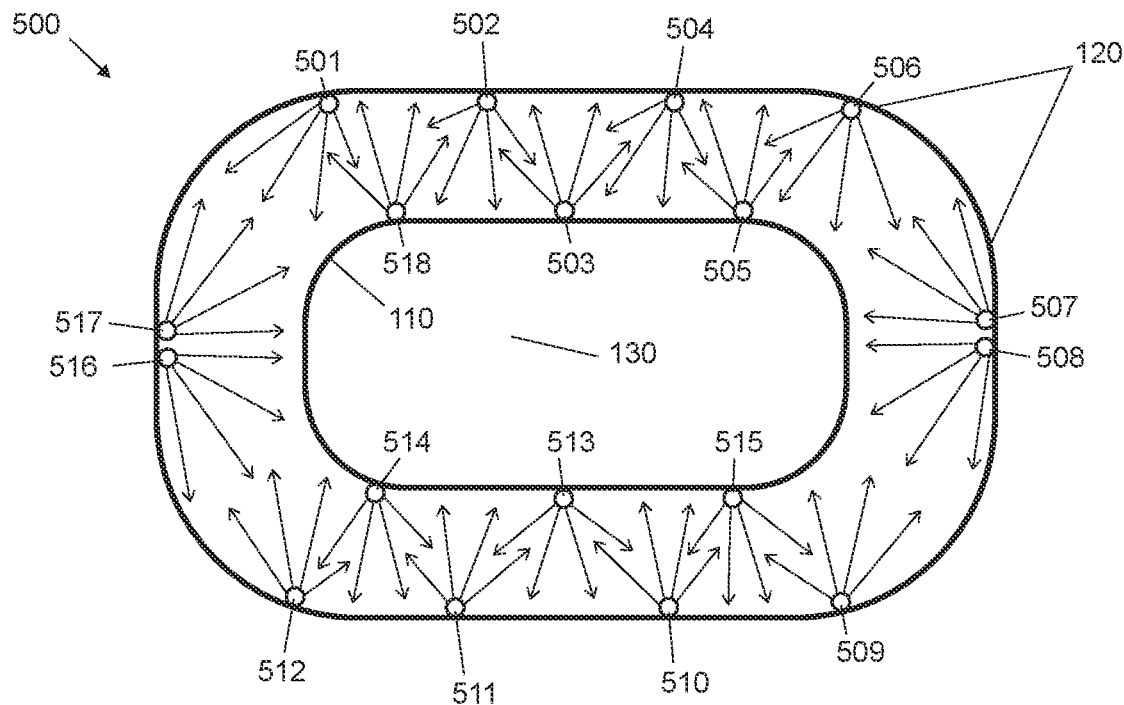
FIG. 5 is a top down view of the directional antennas in the seating region of the venue, where the antennas are generally located and oriented off-normal in an overlapping, alternating pattern near the inner and outer boundaries of the venue.

FIG. 5 depicts an arrangement and orientation of a plurality of directional antennas 501-518 in the seating region of a venue. The venue is as described for FIG. 1. Here, directional antennas are generally located and oriented off-normal in an alternating pattern near the inner and outer boundaries of the venue. Of note, arranging the antennas in an alternating, substantially overlapping manner near the inner boundary 110 and outer boundary 120 provides benefits of overlapping antenna systems, as well as inner and outer boundary mounted systems.

For example, the substantially overlapping manner of beam patterns of a first antenna with the beam pattern of a counter-clockwise adjacent antenna allows the first antenna to provide additional beam coverage (and communication bandwidth) to dense regions of users in the adjacent antenna's beam pattern. Further, as adjacent antennas are not oriented directly toward each other, there is reduced interference between antennas while still providing the benefits of overlapping beam coverage. In addition, alternating antennas located near the outer boundary 120 provide high mounting points (e.g., flag poles, light arrays, etc), and minimal disturbance to spectators during live-performance maintenance or repairs. Inner boundary 110 positioned antennas also provide reduced disturbance to spectators during maintenance and repairs, as well as reducing the cabling required to network the antennas with a communication hub.

Figure 6:
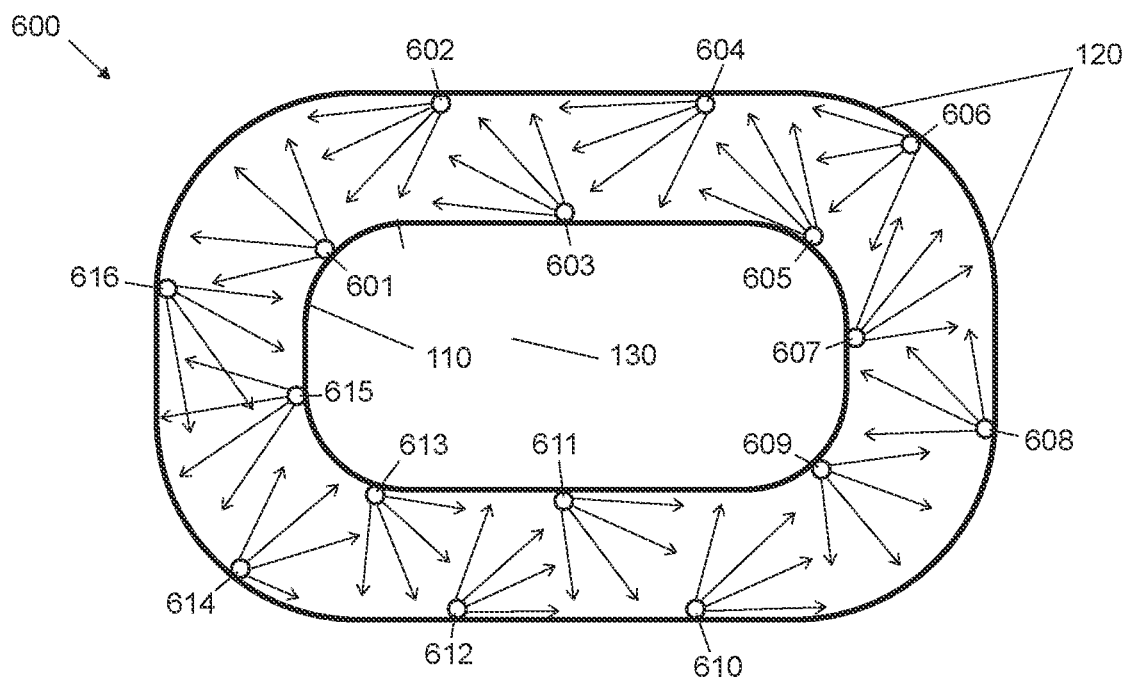
FIG. 6 is a top down view of the directional antennas in the seating region of the venue, where the antennas are generally located and oriented off-normal in a non-overlapping, alternating pattern near the inner and outer boundaries of the venue.

FIG. 6 depicts an arrangement and orientation of a plurality of directional antennas 601-616 in the seating region of a venue. The venue is as described for FIG. 1. Here, directional antennas are generally located and oriented off-normal in an alternating pattern near the inner boundary 110 and outer boundary 120 of the venue. Arranging the antennas in an alternating, substantially non-overlapping manner near the inner and outer boundaries is thought to provide some of the benefits of systems with all outer boundary 120 positioned antenna or all inner boundary 110 positioned antenna.

For example, alternating antennas located near the outer boundary 120 provides high mounting points (e.g., flag poles, light arrays, catwalk 140, etc), minimal disturbance to spectators during live-performance maintenance or repairs. Further, orienting the outer boundary 120 antennas substantially toward the event region 130 allows providing wireless communication service to event ground crew or participants (e.g., staff, athletes, etc.). Inner boundary 110 positioned antennas also provide reduced disturbance to spectators during maintenance and repairs, as well as reducing the cabling required to network the antennas with a communication hub.

Figure 7:
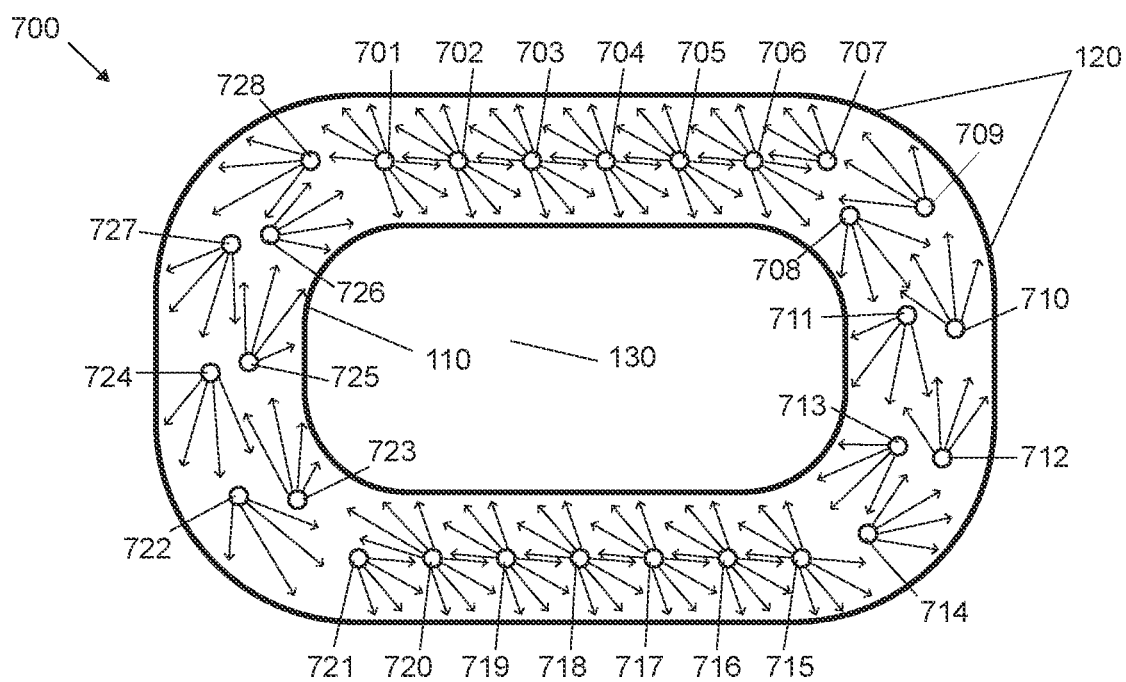
FIG. 7 is a top down view of the directional antennas in the seating region of the venue where the antennas are both single and dual-directional antennas, positioned in two bands of antennas, the first generally oriented in a counter-clockwise fashion, and the second oriented in a clockwise fashion.

FIG. 7 depicts an arrangement and orientation of a plurality of directional antennas 701-728 in the seating region of a venue. The venue is as described for FIG. 1. Here, the directional antennas are generally located and oriented off-normal in an alternating pattern near the midpoint of the venue seating region. Advantageously, these dual-directional antennas with non-overlapping beam patterns are positioned at or near a single location. Such an arrangement advantageously optimizes repairs and maintenance, as two antennas are located generally at a single location. Further, as generally more antennas are directed at narrower regions of the venue, communication throughput and signal quality are favorably increased.

Yet further, as there are now two bands of antennas, the first generally oriented in a counter-clockwise fashion, and the second oriented in a clockwise fashion, similarly oriented antennas retain the ability to redirect beams to regions of high user density in the overlapping beam patterns of adjacent antennas. Lastly, the beam patterns of a first antenna oriented in a counter-clockwise fashion and an adjacent antenna oriented in a clockwise fashion abut each other, but generally do not overlap, thereby providing increased wireless communication performance while minimizing interference between adjacent antennas.

As generally more antennas are directed at narrower regions of the venue, communication throughput and signal quality are favorably increased. Further, placing each antenna near the midpoint of the seating region advantageously allows the antenna to be mounted on preexisting features in the venue (e.g., hand rail 143, wall, speaker, etc), preferably at the opening of pedestrian tunnel (e.g. tunnel opening 141) into the seating region. Such an arrangement also favorably allows for beams of antennas oriented generally toward the event region 130 to be redirected to provide wireless communication services in the event region. This is ideal if the event participants (e.g., coaching staff, ground crew, production staff, athletes, musicians, etc) require wireless communication services to coordinate or conduct the event. This arrangement also reduces interference between antennas in the venue, as half of the antennas are directed toward the outer boundary 120 of the venue, thus out-of and away-from other antennas in the venue.

Figure 8A:
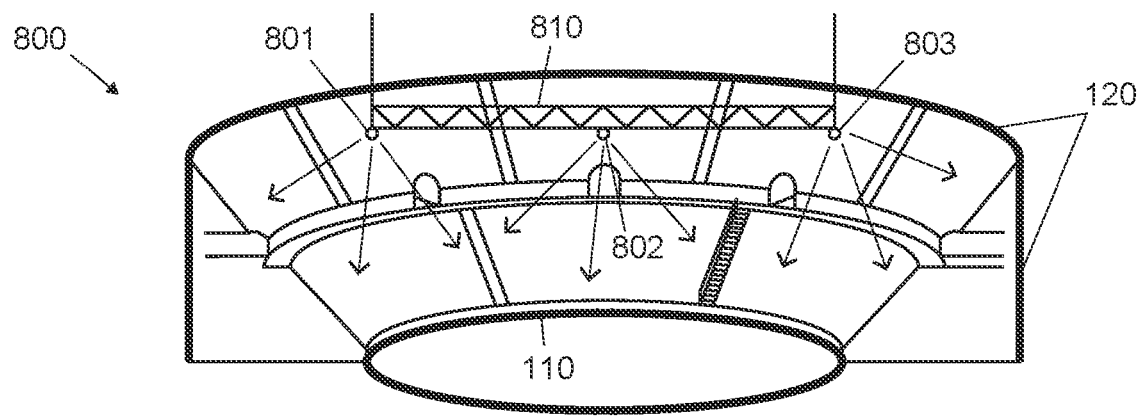
FIG. 8a depicts a cross-sectional view of the arrangement and orientation of a plurality of directional antennas in the venue, where the antennas are suspended above the event region of the venue via a catwalk.

FIG. 8a depicts an arrangement and orientation of a plurality of directional antennas 801-803 suspended above the event region 130 of the venue via catwalk 140. The venue is as described for FIG. 1. Here, directional antennas are generally located on an elevated platform (e.g. a catwalk, building scaffolding, building support structures, etc) above the venue event region, oriented outward from the event region 130 toward the outer boundary. The antennas are advantageously located above the event region 130 to provide a wider range of signal coverage, and overcome possible interference from equipment within the event region. In preferred embodiments, catwalk 140 extends over a substantial portion of event region 130 of the venue, with multiple attachment points for the coupling of antennas to the catwalk 140.

Figure 8B:
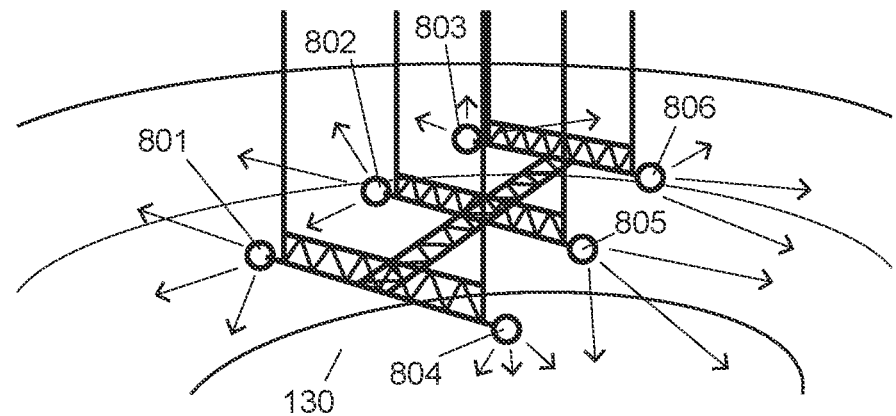
FIG. 8b depicts a top-side view of the arrangement and orientation of a plurality of directional antennas suspended above the event region of the venue via a catwalk.

FIG. 8b depicts an arrangement and orientation of a plurality of directional antennas 801-806 coupled to catwalk 140. The venue is as described for FIG. 1. Here, directional antennas 801-806 are generally evenly distributed on catwalk 140 so as to provide an even coverage region for the users in the venue seating region. In preferred embodiments, this configuration of physical separation of directional antennas 801-806 from each other provides a simpler installation process, due to the lessened number of antennas, and wider coverage region due to the antennas not being installed at or near ground level where the possibility of signal interference is greater.

Figure 8C:
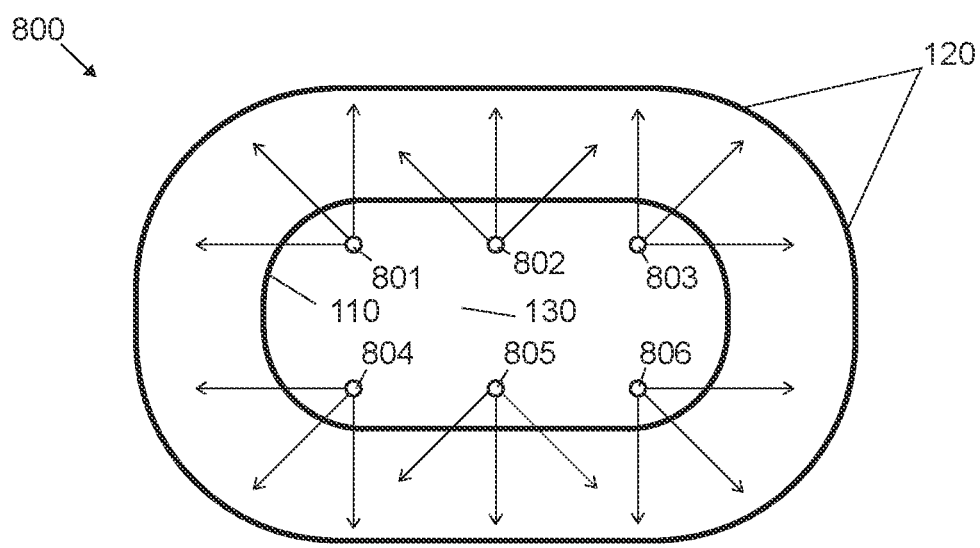
FIG. 8c depicts a top-down view of the arrangement and orientation of a plurality of directional antennas in the venue, where the antennas are suspended above the event region of the venue via a catwalk.

FIG. 8c depicts a top down view of the plurality of directional antennas 801-806 suspended above the event region 130 of the venue via catwalk 140. The venue is as described for FIG. 1. Here, directional antennas 801-806 are generally located on an elevated platform above the venue event region, oriented outward from the event region 130 toward the outer boundary. The antennas are advantageously located above the event region 130 to provide a wider range of signal coverage, and the antenna beam patterns are directed in a non-overlapping configuration to overcome possible interference from equipment within the event region (e.g. stadium or event staff communication systems).

Figure 9:
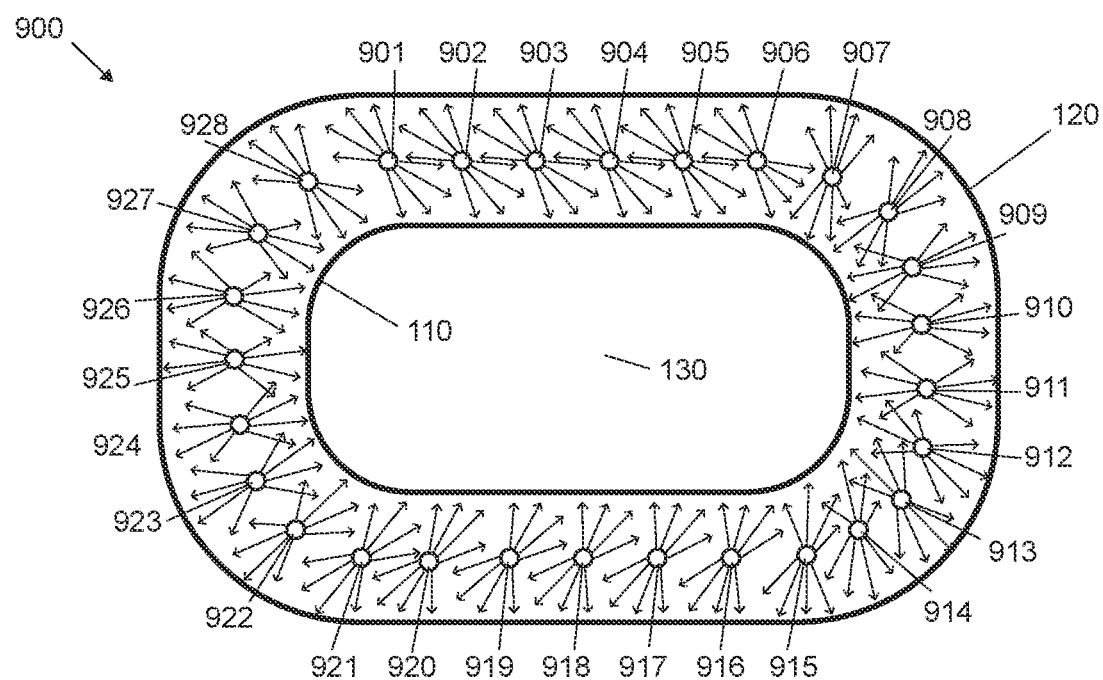
FIG. 9 depicts a top down view of the arrangement and orientation of the directional antennas in the seating region of the venue, where a first antenna in the venue is collocated with a second antenna having a generally opposite orientation, with the first antenna generally oriented toward the outer boundary and the second antenna generally oriented toward the inner boundary of the venue.

FIG. 9 depicts an arrangement and orientation of a plurality of directional antennas 901-928 in the seating region of a venue. The venue is as described for FIG. 1. Here, directional antennas are generally located at a midpoint of the seating region and oriented off-normal from the inner or outer boundary. Of note, each antenna in the venue having first orientation is collocated with an antenna having a generally opposite orientation (e.g., about 180° from the first orientation), with one antenna generally oriented toward the outer boundary 120 and the other antenna generally oriented toward the inner boundary 110. Such an arrangement again advantageously optimizes repairs and maintenance, as two antennas are located generally at a single location.

As generally more antennas are directed at narrower regions of the venue, communication throughput and signal quality are favorably increased. Further, placing each antenna near the midpoint of the seating region advantageously allows the antenna to be mounted on preexisting features in the venue (e.g., hand rail 143, wall, speaker, etc), preferably at the opening of pedestrian tunnels (e.g. tunnel opening 141) into the seating region. Such an arrangement also favorably allows for beams of antennas oriented generally toward the event region 130 to be redirected to provide wireless communication services in the event region. This is ideal if the event participants (e.g., coaching staff, ground crew, production staff, athletes, musicians, etc) require wireless communication services to coordinate or conduct the event. This arrangement also reduces interference between antennas in the venue, as half of the antennas are directed toward the outer boundary 120 of the venue, thus out-of and away-from other antennas in the venue.

The discussion herein provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities of components, properties such as orientation, location, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for providing wireless communication to users in a venue comprising:
   a plurality of directional antennas, wherein each directional antenna is located between an inner and an outer boundary of the venue;
   wherein each directional antenna has at least a first beam pattern and a second beam pattern;
   wherein the first beam pattern is oriented at an angle off-normal from the inner boundary, such that the first beam pattern is directed toward and at least partially overlaps a beam pattern of a first adjacent antenna, producing a first overlapped beam pattern; and
   wherein the second beam pattern is oriented at an angle off-normal from the outer boundary, such that the second beam pattern is directed toward and at least partially overlaps a beam pattern of a second adjacent antenna, producing a second overlapped beam pattern.

2. The system of claim 1, wherein each antenna of the plurality of directional antennas is oriented at the same angle α.

3. The system of claim 1, wherein each antenna of the plurality of directional antennas has a beam pattern of at least 40°.

4. The system of claim 1, wherein at least one of the plurality of directional antennas is a lens based multi-beam antenna having a high band beam and a low band beam.

5. The system of claim 1, wherein the first beam pattern and the second beam pattern are different.

6. The system of claim 1, wherein the first beam pattern and the second beam pattern are the same.

7. The system of claim 1, wherein the first adjacent antenna and the second adjacent antenna are the same.

8. The system of claim 1, wherein a beam pattern of at least one additional directional antenna abuts a beam pattern of an antenna of the plurality of directional antennas.

9. The system of claim 1, wherein at least one of the first overlapped beam pattern and the second overlapped beam pattern is steerable.

10. The system of claim 1, wherein at least some of the plurality of directional antennas are placed at pedestrian tunnels in the venue.

11. The system of claim 2, wherein α is about 45°.

12. The system of claim 1, wherein the plurality of directional antennas comprises at least 1 antenna for every 3,000 seats in the venue.

13. The system of claim 1, wherein each antenna of the plurality of directional antennas is spaced consistently from at least the first adjacent antenna and second adjacent antenna.

14. The system of claim 2, wherein each antenna of the plurality of directional antennas is placed near a midpoint between the inner and outer boundaries, and wherein α is about 90.

* * * * *